United States Patent [19]
Ulbrich et al.

[11] 3,711,994
[45] Jan. 23, 1973

[54] POWER WINDOW IN MOTOR VEHICLE
[75] Inventors: Gerhard Ulbrich, Buehl; Gert Kuhbauch, Buehlertal; Ernst Fischer, Oberweier, all of Germany

[73] Assignee: Robert Bosch G.m.b.H., Stuttgart, Germany

[22] Filed: April 16, 1971
[21] Appl. No.: 134,683

[30] Foreign Application Priority Data
April 20, 1970 Germany............P 20 18 807.2

[52] U.S. Cl. ..................49/139, 49/334, 49/338, 74/625
[51] Int. Cl. ...............................E05f 15/12
[58] Field of Search..........49/139, 141, 26, 333, 334, 49/355, 336, 337, 338; 74/599, 625

[56] References Cited

UNITED STATES PATENTS

| | | | |
|---|---|---|---|
| 3,141,663 | 7/1964 | Voiles | 49/334 |
| 3,478,470 | 11/1969 | Andres | 49/337 |
| 3,204,946 | 9/1965 | Pickles | 49/334 X |
| 2,324,145 | 7/1943 | Floraday | 49/26 |

*Primary Examiner*—Kenneth Downey
*Attorney*—Michael S. Striker

[57] ABSTRACT

A window in a motor vehicle is mounted for pivotal movement about a pivot element. An electric motor drives a gear unit whose output shaft is coupled with the pivot in such a manner that pressure manually exerted upon the window disconnects the output shaft from the pivot so that the window can be manually moved in the event this is desirable or necessary because of malfunction of the motor or the gear unit.

7 Claims, 3 Drawing Figures

PATENTED JAN 23 1973

INVENTOR
GERHARD ULBRICH
GERT KÜHBAUCH
ERNST FISHER
BY
ATTORNEY

POWER WINDOW IN MOTOR VEHICLE

BACKGROUND OF THE INVENTION

The present invention relates generally to motor vehicles and more particularly to a power window construction in a motor vehicle.

Power windows are still optional equipment on most makes of motor vehicles. They are, however an option which is enjoying increasing popularity. Owing perhaps to their relatively simple construction, power windows are not particularly prone to malfunctions; on the other hand, malfunctions can, and occasionally do occur with this type of equipment. Unfortunately, if a malfunction in a power window occurs it presents the vehicle operator and/or passengers with the difficulty that these windows cannot be manually operated. This is not too serious in most instances, if the malfunction occurs with the window closed, so that the window cannot be opened. However, if the malfunction occurs with the window in opened condition, then the resulting problems may be very annoying indeed, for instance in case of inclement weather. In known power windows, and speaking now by way of example of the type of window — usually a vent window — which is pivoted about a pivot axis rather than raised or lowered, the output shaft of the gear drive is non-releasably connected with the pivot of the window. Because the gear unit must have a high step-down ratio or may even be constructed as a worm drive, in order to obtain the desired slow movement of the window between its open and closed positions, manual displacement of the window in case of malfunction in the power unit associated with the window is at best difficult and usually impossible.

Thus far no remedy has been known for this problem.

SUMMARY OF THE INVENTION

It is, accordingly, an object of the present invention to provide an improved power window construction in motor vehicles, which is not possessed of the above-mentioned disadvantages.

A concomitant object of the invention is to provide such a construction which is simple and therefore inexpensive and reliable.

An additional object of the invention is to provide such a construction which requires for its manual operation in case of need no particular skill or facility on the part of the user.

In pursuance of the above objects, and others which will become apparent hereinafter, one feature of the invention resides, in a motor vehicle, in a combination comprising a window and displaceable mounting means mounting the window for displacement between a first and a second position. An electric motor is provided and gear means is driven by the motor and is operative for displacing the mounting means in a sense effecting displacement of the window between the aforementioned positions thereof. There is further provided in accordance with the invention, manually releasable coupling means which connects the gear means and the mounting means and is accessible to an operator of the motor vehicle, for enabling disconnecting of the gear means from the mounting means as a precedent to manual displacement of the window between its positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
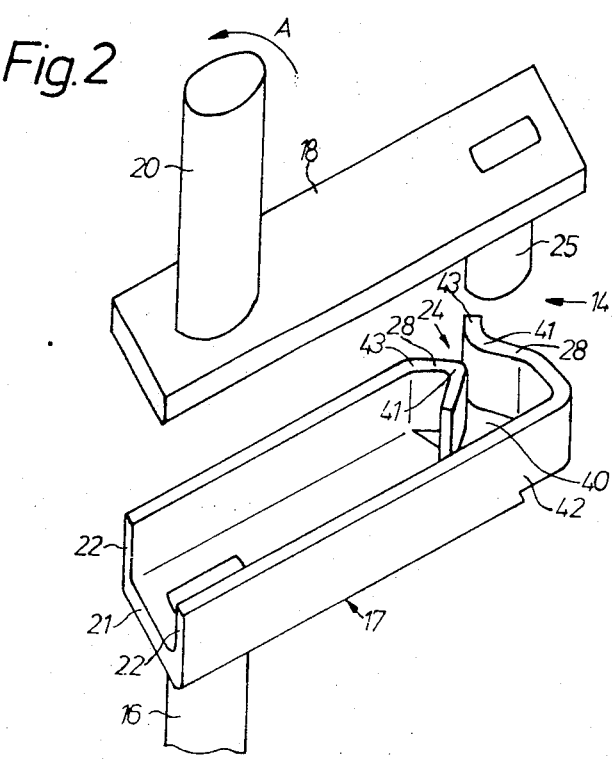
FIG. 2 is a perspective exploded detail view showing details of the embodiment in FIG. 1.

Discussing now the drawing in detail, and firstly the embodiment in FIGS. 11 and 2 thereof, it will be seen that reference numeral 1 generally identifies the door of a motor vehicle which in itself is not illustrated, not being necessary for an understanding of the invention. Accommodated in conventional manner within the door 11 is an electrically operated motor 12 which cooperates with a conventional gear drive 13 to pivot a window 15 which in the illustrated embodiment is shown to be a vent-window.

The gear drive 13 operates on the window 15 in a sense displacing the same between open and closed positions via a friction coupling 14 which is provided according to the present invention. As shown in the drawing, and particularly in FIG. 2, the gear drive unit 13 has an output shaft 16 on which there is fastened a pivot 17 of generally U-shaped cross-section, so that the arm is provided with a bight 21 and two lateral legs 22 which face in the direction away from the shaft 16. A turnable arm 18 is spaced slightly from the arm 17 in parallelism therewith and is fixed with the pivot 20 which mounts the window 15 in the window frame 19 of the door 11. It should be noted that the pivot 20 is in axial alignment with the output shaft 16 of the gear drive unit 13 and that the arm 17 is located on a free end portion of the shaft 16 while the arm 18 is located on a free end portion of the pivot 12.

Figure 1:
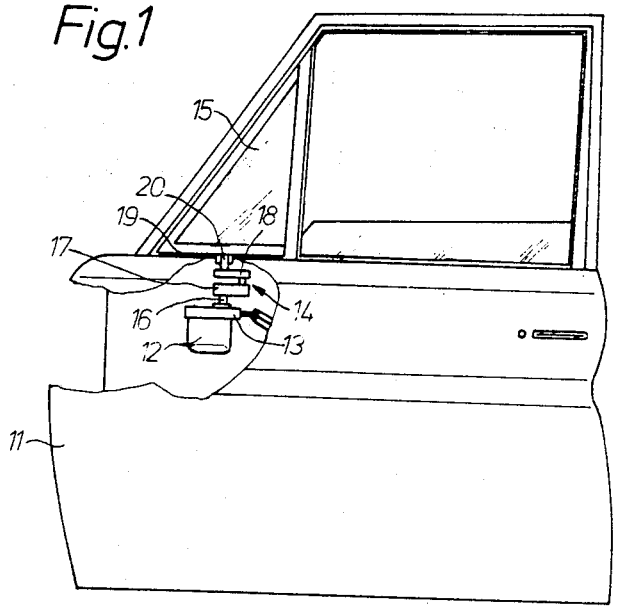
FIG. 1 is a side view of a motor vehicle door with a window, with the door partly broken away to show an embodiment of the invention.

The coupling means according to the present invention, identified with reference numeral 14, is shown most clearly in FIG. 2 as concerns the embodiment of FIGS. 1 and 2. It is of two sections one of which is composed of two springy brackets or tongues 28 which are of one piece with the legs 22 of the arm 17, that is which are end portions of these legs projecting beyond the bight 21 both longitudinally and transversely as shown in FIG. 2. The other arm 18 carries a projection, pin, bolt or the like, which is identified with reference numeral 25 and which normally is located between and frictionally retained by the tongues 28 of the arm 17, whereby the arms 17 and 18 are normally locked together for joint displacement when the output shaft 16 of the gear drive unit 13 rotates.

FIG. 2 shows a space 40 which is defined between the tongues 28 and in which the pin 25 is normally accommodated. Inwardly converging portions 43 of the tongues 28 define a convergent inlet 24 which guides the pin 25 when it is to be connected with the tongues 28, and from the narrowest point of this passage or inlet 24 portions 41 of the tongues 28 diverge inwardly into the space 40 which opposite the entry is closed by a portion 42 of one of the tongues 28. The distance between the center of space 40 and the pivot axis of the shaft 17 corresponds to the distance between the pivot axis of shaft or pivot 20 and the pin 25.

It will be appreciated that normally when the pin 25 is received in the space 40, energization of the electromotor 12 causes the output shaft 16 of the drive 13 to turn the arm 17 which takes along — via the tongues 28 and the pin 25 — the arm 18 to thereby turn the pivot 20 and displace the window 15. Assuming, now, that the window is for instance in open condition and the power drive malfunctions, then it is possible to exert pressure on the window 15 in order to close it manually, because pressure so exerted displaces the window 15 about the pivot 20 as soon as the pressure overcomes the frictional retention of the pin 25 in the space 40 between the tongues 28, so that the pin 25 snaps out of the space 40. Now the window can be readily turned manually to open or closed position until such time as the malfunction of the power drive is corrected.

It will be appreciated that it is important for the inwardly convergent inlet 24 to face in the closure direction A of the window 15 so that the pin 25 can snap out of the space 40 when pressure is exerted on the open window in a sense moving it to closure position. It will also be appreciated that as a matter of course the engagement between the tongues 28 and the pin 25 is sufficiently strong so that during normal operation of the window by means of the power drive the pin 25 cannot snap out of the space 40.

Figure 3:
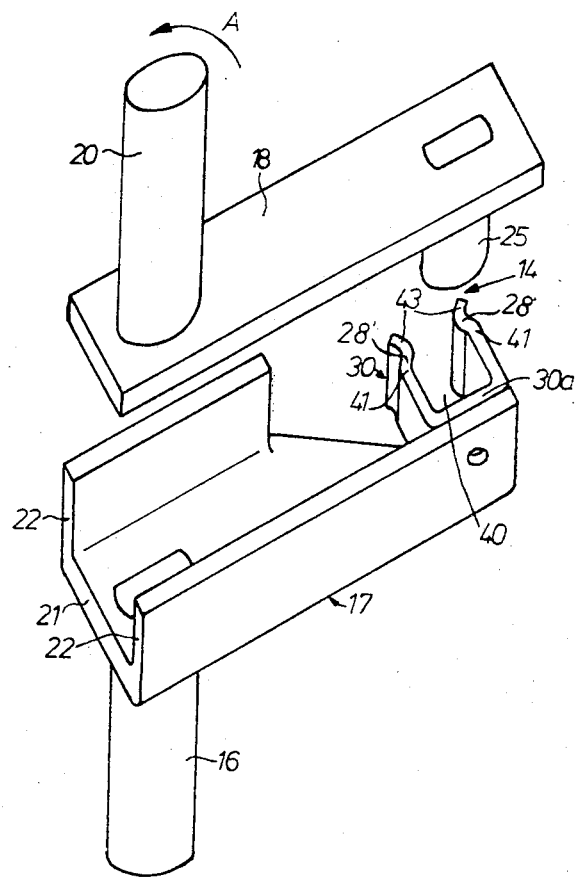
FIG. 3 is a view similar to FIG. 2 but illustrating a different embodiment of the invention.

The embodiment of FIG. 3 differs from that of FIGS. 1 and 2 in that the springs which engage the pin 25 are not of one piece with the legs 22 of the arm 17. Instead, the springs — which are here identified with reference numeral 28' — are part of a substantially U-shaped spring clamp 30 whose bight 30a is secured in suitable manner, by welding, riveting, by screw-threaded connection, to one of the legs 22 of the arm 17 which is made longer than the other leg, as illustrated in FIG. 3. The end portions 43 of the tongues 28' are again configurated in a manner as discussed with reference to FIG. 2, namely to inwardly converge into the inner space which normally accommodates the pin 25, and which is identified with reference numeral 40 as before.

In all other respects the embodiment of FIG. 3 is the same as that of FIGS. 1 and 2.

The coupling means according to the present invention can be particularly readily and simply installed when the arms 17 and 18, the pin 25 and the tongues 28 or 28' are provided as in the embodiments of FIGS. 1 - 2 and 3, respectively. However, it is clear that other possibilities also exist and that the two embodiments shown are provided for illustrative purposes only. It is also clear that the arrangement can be made in such a manner that the window can not only be disengaged from the output shaft 16 of the gear drive unit 13 when it is open position by exerting pressure upon it in a sense tending to move it to closed position, but also when it is in closed position by exerting pressure upon it in a sense tending to move it to open position. The necessary modification will offer itself readily to those skilled in the art from what has been set forth herein. Similarly, the springs or tongues 28, 28' could be configurated differently from what is illustrated, they could be constituted by other elements than those shown, or they could be replaced with other means capable of releasably engaging and retaining the pin 25.

It will be understood that each of the elements described above, or two or more together, may also find a useful application in other types of constructions, differing from the types described above.

While the invention has been illustrated and described as embodied in a power window for motor vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a motor vehicle, in combination, a window; displaceable pivot means mounting said window for displacement between a first open and a second closed position; an electric motor having an output shaft; gear means driven by said motor and operative for displacing said pivot means in a sense effecting displacement of said window between said positions; and manually releasable coupling means connecting said gear means and said pivot means and accessible to an operator of the motor vehicle, for enabling disconnecting of said gear means from said pivot means as a precedent to manual displacement of said window between said positions, said coupling means including a first coupling component provided on said output shaft, and a second coupling component provided on said pivot means and frictionally engaging said first coupling component, said coupling means being constructed and arranged for disengagement of said coupling components in response to exertion of pressure upon said window at least when the latter is in said open position.

2. In a motor vehicle as defined in claim 1, said gear means having an output shaft coaxial with said pivot means an each having a projecting arm pivotable in response to turning movement of said output shaft and pivot means, respectively; and wherein said coupling means engages and circumferentially connects respective free ends of said arms.

3. In a motor vehicle as defined in claim 2, said coupling means comprising a projection on said free end of one of said arms, and spring means on said free end of the other arm and embracing said projection from opposite sides with a predetermined force.

4. In a motor vehicle, in combination, a window; displaceable pivot means mounting said window for displacement between a first and a second position about a pivot axis, said pivot means having a first projecting arm; an electric motor; gear means driven by said motor and operative for displacing said pivot means in a sense effecting displacement of said window between said position, said gear means having an output shaft coaxial with said pivot means and a second projecting arm; manually releasable coupling means connecting said gear means and pivot means and accessible to an operator of the vehicle, said coupling means comprising a projection on a free end of one of said arms, and substantially U-shaped spring means on a free end of the other arm and embracing said projection from opposite sides with predetermined force.

5. In a motor vehicle as defined in claim 4, said other arm being of substantially U-shaped cross-section and having a bight portion and a pair of leg portions projecting beyond said bight portion at said free end and constituting said spring means.

6. In a motor vehicle as defined in claim 4, said spring means comprising a substantially U-shaped clamp having a bight fixed to said free end of said other arm, and a pair of legs springily engaging said projection.

7. In a motor vehicle as defined in claim 4, said spring means comprising a pair of spring portions defining between themselves an inner space dimensioned for clamping accommodation of said projection, and an outer space converging towards and merging with said inner space and forming a circumferentially facing open side for passage of said projection into and out of said space.

* * * * *